United States Patent [19]

Hunn et al.

[11] 4,174,888
[45] Nov. 20, 1979

[54] AUTOMATIC FILM TRANSPORT MONITORING SYSTEM

[75] Inventors: Hans Hunn, Biberstein; Georg Schwarz, Zurich, both of Switzerland

[73] Assignee: Canon, Inc., Tokyo, Japan

[21] Appl. No.: 852,220

[22] Filed: Nov. 17, 1977

[30] Foreign Application Priority Data

Nov. 26, 1976 [CH] Switzerland .................. 14898/76

[51] Int. Cl.² ......................................... G03B 1/60
[52] U.S. Cl. ................................. 352/170; 352/172;
354/217; 354/218
[58] Field of Search ............... 352/170, 172; 354/212,
354/213, 215, 217, 218, 289

[56] References Cited

U.S. PATENT DOCUMENTS

| 3,776,625 | 12/1973 | Fountain | 352/170 |
| 3,977,776 | 8/1976 | Wagensonner et al. | 351/171 |
| 4,021,828 | 5/1977 | Iura et al. | 354/217 |

FOREIGN PATENT DOCUMENTS

| 2505575 | 9/1975 | Fed. Rep. of Germany | 354/217 |
| 2521158 | 11/1976 | Fed. Rep. of Germany | 354/217 |

*Primary Examiner*—Russell E. Adams
*Attorney, Agent, or Firm*—Frishauf, Holtz, Goodman & Woodward

[57] ABSTRACT

To check movement of film in still, or motion picture cameras, a movement sensing means is coupled to the film, for example a cam-operated switch coupled to the film payout spindle, an opto-electrical sensor sensing perforations in the film or the like, and generating film motion pulses. The pulses are counted in an evaluation circuit enabled when film movement is commanded, the evaluation circuit providing an alarm output if a predetermined number of output pulses has not been attained. When related to a motion picture camera, a timing circuit is included to check the generation of the number of pulses within a predetermined timing interval.

12 Claims, 6 Drawing Figures

AUTOMATIC FILM TRANSPORT MONITORING SYSTEM

Prior Art relevant to the concept of the present application:
Swiss Pat. No. 467,464, Blaschke;
Swiss Pat. No. 485,251, Vockenhuber et al.

The present invention relates to a system to monitor movement of film in still cameras, or motion picture cameras, and more particularly to check whether the film transport occurring in such cameras is proper.

A continuous problem arises both with still and motion picture cameras that interference with proper winding or reeling of the film cannot be readily determined by the user. Interference can be caused, for example, by a break of the film, by improperly threaded film, by film which has not been properly gripped by the take-up spindle, or take-up spool, the lack of film in the camera entirely, or that the maximum number of exposures capable to be made on a given length of film has been exceeded.

It has previously been proposed to sense interference with proper film transport in motion picture cameras by driving a pulse source by means of a slip clutch. When the slip clutch responds, a trouble signal is generated (see referenced Swiss Pat. No. 467,464). Such devices are suitable only for motion picture cameras and cannot be used with still cameras. Additionally, they require substantial mechanical apparatus which can be fitted in compact cameras only with greatest difficulty.

THE INVENTION

It is an object to provide a reliably operating film transport indicator for the user to show the user that the film is properly transported within the camera, and which is small, simple, and can readily be powered by the small batteries already present in most cameras, while drawing only minute amounts of power therefrom.

Briefly, a pulse generator is provided, associated with a spindle or spool in the camera, preferably the payout spindle or spool of the film, or energized by the film itself, and which provides a predetermined number of pulses for any given length of film. A pulse evaluation circuit is provided sensing the number of pulses with which that predetermined length of film is to be associated and, if a minimum number of pulses is not received, provides a trouble or malfunction or alarm signal. In case of motion picture cameras, a timing circuit can be included to allocate a specific length of film to the running speed of the camera.

Trouble indication can thus be provided both for still or single-frame cameras as well as for motion picture cameras, to show that the film is not properly wound up by, preferably, sensing its payout. In case of film breakage, or in motion picture cameras using a spool of finite length, the wind-up reel may continue to operate properly, without any film being transmitted from the payout reel, however. The speed of operation of the wind-up lever in still cameras is irrelevant, since the number of pulses which are associated with any given length of film is determined only by the longitudinal transport of the film itself, not by the time it takes to wind the film.

The system can readily be constructed to use a minimum number of electronic components which can easily be integrated in even the crowded space within a camera housing. The circuit is so arranged that, unless it is counting, no current is drawn thereby and, when the circuit is in operation, that is, when the circuit is actually monitoring film transport, only a tiny amount of energy is drawn, which is so negligible that it does not noticeably affect the life of the batteries usually found in cameras to operate automatic or semi-automatic exposure control apparatus and indicators, or the like.

Drawings, illustrating an example:

Figure 6:
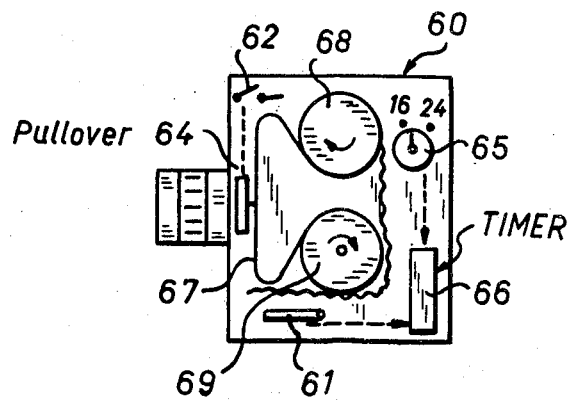

and FIG. 6 is a highly schematic view of a motion picture camera, with the cover open, illustrating components which are used in the system, when applied to a motion picture camera.

The basic system will be described in connection with a 35 mm SLR camera 48, which has the customary components such as body, lens, view finder, shutter, film transport lever, rewind lever, and the like. The components, to the extent that they are not material to the present invention, have been indicated only schematically and need not be described.

A battery 28 is provided to supply electrical energy for various camera functions, for example control of shutter, shutter speed, light meter, or the like. Additionally, it is used to supply energy for the circuit of the present invention.

Figure 4:
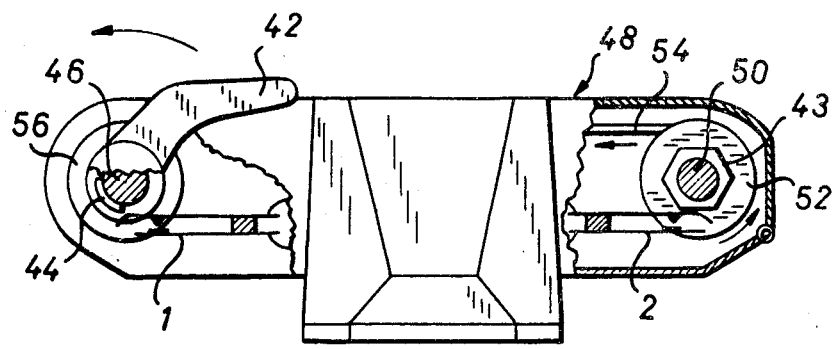
FIG. 4 is a highly schematic top view of the camera of FIG. 1, partly broken away, and showing one arrangement of a pulse source.

When the wind-up lever 42 for the film transport is used, for example manually, or automatically by a motor drive, film 54 (FIG. 4) inserted in the camera is transported by one frame. Upon operation of the wind-up lever 42, a cam 44 secured to the wind-up lever shaft 46, or a similar operating element which is moved when the film is wound up, closes a main switch 1, which energizes the circuit in accordance with the present invention. Upon closure of switch 1, the monitoring system is energized. Unless switch 1 is closed—which occurs only during wind-up operations, the circuit is de-energized and draws no current. The cam 44 need not be placed directly on shaft 46; it can be operated, for example, by one or more mechanical intermediate elements such as gears, a friction drive, or the like, or be coupled to other moving parts.

Figure 1:
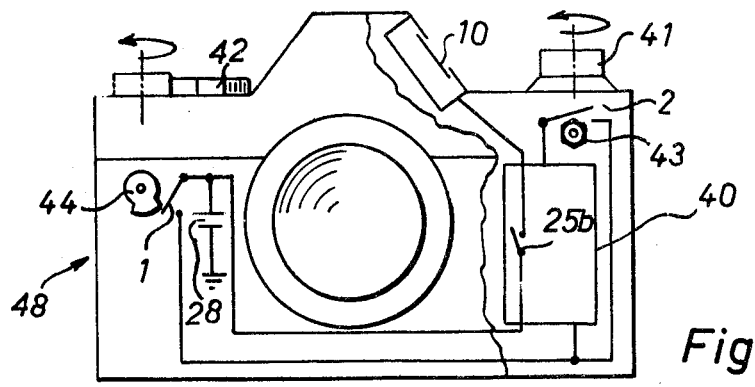
FIG. 1 is a highly schematic illustration of the components of the system incorporated in a single lens reflex (SLR) camera, the housing of which is partly broken away, to illustrate the circuit, in highly simplified form.
Figure 2:
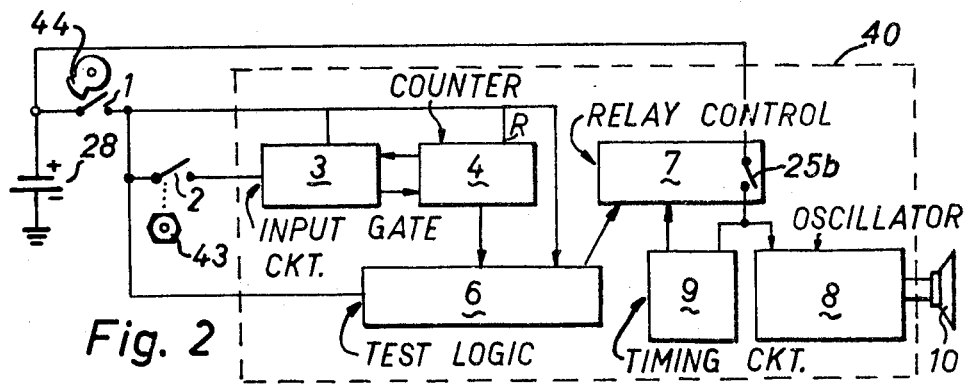
FIG. 2 is a block circuit diagram of the system, illustrating its basic component.

Shaft 50 (FIG. 4) of the film payout spool is coupled to the rewind lever 41 (FIG. 1). A cam 43 is secured to the shaft 50, or to another shaft journalled in the camera and in driving connection with the payout spindle or shaft 50. Cam 43 operates a switch 2. The cam 43 has a plurality of lands so that, upon one revolution of the payout spool 52, and upon transporting a frame of the film 54, the tension on shaft 50 causes the cam 43 to rotate and thus to repeatedly open and close switch 2. Switch 2, together with the cam 43, forms a pulse source. Repeated opening and closing of the switch 2 is sensed by an input gate circuit 3 (FIG. 2) which contains input gates, the pulses being applied to a counter 4 and to a test logic circuit 6. The test logic 6 provides an output if a number of pulses sensed by the circuit 3, counter 4 and logic 6 is below a predetermined number, or if pulses are missing entirely.

Cam 44 is controlled by the wind-up spool of the film. It is so constructed that it closes switch 1 upon initiation of the film transport operation, and opens switch 1 at the end, or almost at the end of the film transport stroke. When the transport stroke has terminated, that is, when switch 1 opens again, test logic 6 is interrogated to determine if a correct film transport has occurred. If so, the film transport monitoring circuit is disconnected and draws no more current. If not, however, that is, if the film has not fed properly, relay control circuit 7, and containing a relay 25 (FIG. 3) closes switch contacts 25b which energizes an indicator oscillator 8 which provides optical or acoustic trouble indication to an indicator 10, for example a buzzer, for a predetermined period, determined by timing circuit 9.

After elapse of a predetermined time interval, for example one or two or a few seconds, oscillator 8 is disconnected by the timing circuit 9, so that the system again is separated from the battery 28 and does not draw current anymore.

The electronic circuitry is connected only during the time that switch 1 is closed, that is, while film transport is actually taking place. Test logic 6 evaluates the opening and closing of switch 2 only during that time period; thus, total energy use is small. The film transport monitoring system requires little space and can be used with most cameras already supplied with a battery. Incorrect film transport to the film wind-up spool 56 (FIG. 4) is indicated to the user immediately when the transport stroke of the wind-up lever is terminated. The reason for the malfunction of transport is not indicated since it is irrelevant to the user. Thus, the system is foolproof and does not merely sense any particular malfunction but, overall, that the film has not beed fed properly, regardless of the cause therefor. The monitoring system is operative only during actual transport—or, rather, during the time that actual transport is expected—and does not require any additional manipulation by the user, that is, any separate connection or disconnection of the monitoring system to obtain an indication, thus reducing drain on the battery.

Rotating the film transport lever 42 (FIG. 1) causes transport of the film by one frame. Simultaneously, switch 1 is closed which provides for current supply to the entire circuit and additionally resets counter 4 (FIG. 2) over reset terminal R. As the film payout spindle rotates, switch 2 is repeatedly opened and closed if the film transport is proper. A plurality of pulses, for example six pulses, are generated during any one film frame feed. These pulses are gated over gates 5 and 30 (FIG. 3), and forming part of the input gate circuit 3 (FIG. 2) and applied to counter 4. As soon as counter 4 has counted a predetermined number of pulses, for example four or five pulses, supply of pulses to the counter 4 is stopped and test logic 6 will receive a continuous signal. If transport was proper, a line from the test logic to relay control circuit 7 remains without voltage, so that oscillator 8 will be de-energized, thus not providing any output. Again, assuming proper film transport—which is the case in most instances—no power is drawn by the oscillator or by the output transducer. If, however, film transport was improper, the number of pulses recorded in counter 4 will remain below the predetermined number. Test logic unit 6 will then provide a signal to the relay control circuit 7 which, in turn, will control the relay to provide energy to the oscillator 8 so that a trouble or malfunction signal can be transmitted over an electro-acoustic transducer 10. Electro-acoustic transducer 10 can be located in an opening of the body of the camera, as schematically shown in FIG. 1, and if the film transport is incorrect, provides an acoustic signal during a predetermined time period. Simultaneously with energization of oscillator 8, a timing circuit 9 is started which interrupts current to the oscillator 8 after a predetermined time period, for example one, two or a few seconds. The monitoring system is again ready to operate after each opening and closing of switch 1. Thus, rapidly sequential film transport operations can be monitored. These may occur, for example, with still cameras equipped with motor drives. The relay control 7 is newly controlled each time if the transport sequences follow each other rapidly so that if, for example, due to film breakage, an early wind-up operation provides an acoustic warning signal, subsequent wind-up operations will likewise indicate malfunction so that the acoustic warning signal will, effectively, be perceived as a continuous signal. The automatic monitoring system separates itself from the battery supply after the last transport movement so that it does not draw energy from the battery when no film transport is actually taking place, or is intended to take place.

Figure 3:
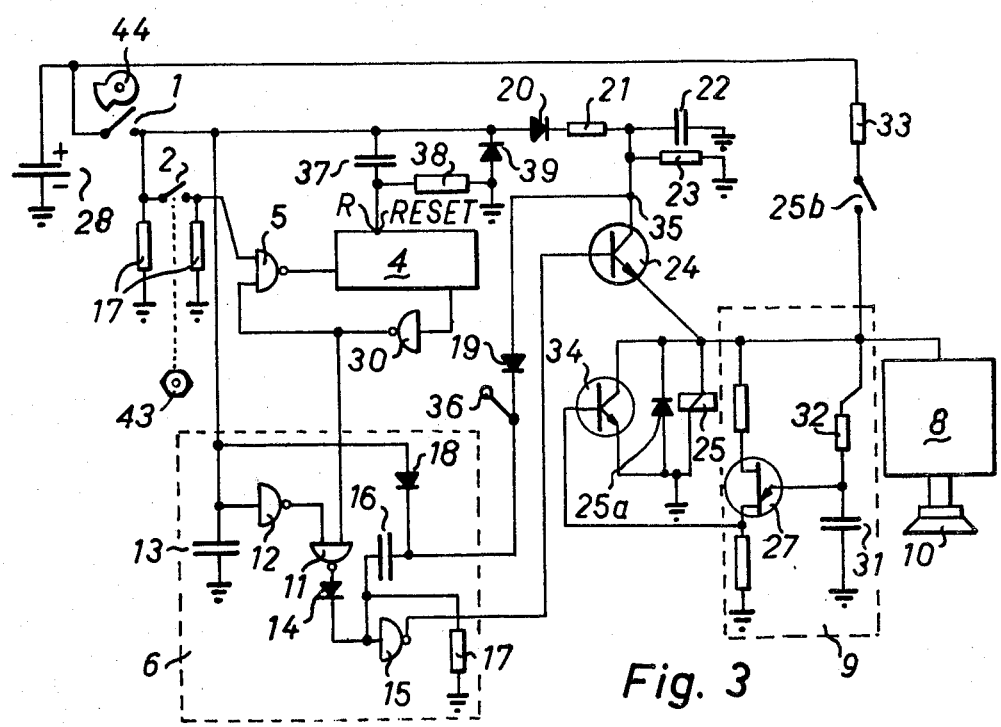
FIG. 3 is a detailed circuit diagram of the system of FIG. 2.

Referring to the specific circuit of FIG. 3: Closing of switch 1 places positive battery voltage over diode 18 to a terminal 36, which forms the current supply terminal for the input gate circuit, that is, forms a current supply for the input to the system. A capacitor 37 transmits a short positive pulse to the R reset terminal of counter 4 so that the counter will reset to its zero or initial state. Capacitor 37 then can discharge to chassis or reference potential over resistor 38. Diode 39 is an anti-kickback and noise suppression diode to bypass any possible negative interference signals. Diode 20 and resistor 21, together, provide for smoothing of the supply voltage and charge a capacitor 22 which later on will supply relay 25 after switch 1 has been opened again. The smoothed voltage is also applied to a terminal 35 and to the collector of a transistor 24. Transistor 24 is normally in blocked or non-conductive condition. Terminal 35 is connected over diode 19 to junction point 36, that is, to the positive supply. A capacitor 16 and diode 14 prevent that the output of the gate 15 reaches a state of logic 1 before an error signal has actually been generated, and thus prevents erroneous operation of oscillator 8 over transistor 24 upon energization of relay 25.

Figure 5:
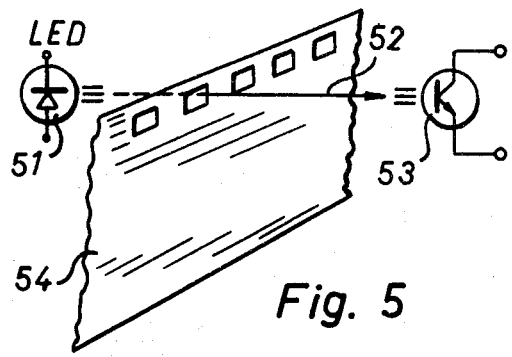
FIG. 5 is a fragmentary perspective view of another arrangement of generating pulses directly from film.

Operation: After closing of switch 1, and assuming proper operation, cam 43 repeatedly opens and closes switch 2. The speed is irrelevant and may be any speed. Usually, the repeated opening and closing of switch 2 is controlled mechanically by the hexagonal multi-land cam 43. Other pulse sources may be used, for example systems which mechanically or optically scan movement of the film, similar to optical scanning of perforated cards or disks; magnetic control may be effected, for example by controlling a Hall generator by a magnet coupled to the payout shaft 50. An optical scanning arrangement is shown in FIG. 5, in which a infrared light-emitting diode (LED) 51 projects a beam of light 52 through the perforations of the film on photo transistor 53. LED 51 can be connected to terminal 36 and chassis, or LED 51 may replace the diode 18 (FIG. 3) since, of course, the LED has diode function. Photo transistor 53 can be replaced by a photosensitive diode, and connected to open and close the circuit from switch 1 to gate 5 in dependence on whether the beam 52 passes through a transport perforation or is blocked by the intervening film strip. The arrangement of FIG. 5 can be placed just ahead of the film pressure plate, in the path of the film, in advance or behind the frame opening.

Switch 2, thus, can be a mechanical switch or an electronic switch. Regardless of its nature, one or a plurality of pulses are generated which are connected through gate 5 to counter 4. When the counter 4 has counted through a predetermined number of count stages, for example four or five, the counter output will be set at a logic 1. If the counter output is at logic 1, gate 30, operating as an inverter, blocks transmission of energy through test logic 6. Thus, when the wind-up stroke is terminated, so that switch 1 opens again, the oscillator 8 will not be energized. Gate 30 prevents transmission of further pulses through the gate 5 as soon as counter 4 has reached the predetermined count state, to provide for self-blocking of the counter 4. Capacitor 13 is provided to prevent rapid drop-off of the voltage after opening of switch 1 and suppresses pulses which may occur if the switch 1 contacts should chatter. Diode 18 transmits positive pulses to the gate 15 rapidly.

The dropping flank of voltage which occurs upon opening of switch 1 is evaluated by the gates 11, 12, diode 14 and gate 15. As soon as counter 4 has counted the requisite number of count stages corresponding to correct film transport, transmission of a positive pulse through gate 15 to the base of transistor 24 is inhibited. If, however, the film transport should be incorrect so that the minimum necessary number of pulses to cause the counter 4 to count to reach a 1-logic state at its output does not occur, the output of gate 11 is switched to a logic 0 as soon as the switch 1 is opened. Gate 15 then, due to its inverting function, provides a positive pulse to the base of transistor 24 which then becomes conductive and permits relay 25 to be energized, and thereby causes relay contact 25b to close. A protective diode 25a is connected across the relay coil 25. The relay 25, protective diode 25a and contact 25b can be replaced by an electronic relay or switch. Relay coil 25 is connected to the operating terminal of relay contact 25b so that the relay will be self-holding. Simultaneously, oscillator 8 is provided with current. The oscillator 8 is preferably connected to an electro-acoustic transducer 10. Such transducers are known and, for example and preferably include a piezo ceramic crystal disk which is secured to a thin copper plate, formed with a ring-shaped crease and fitted in an opening of the body of the camera, for example secured by an adhesive. Piezo-electric transducers of this type are commercial articles and are sold, for example, by Philips, Eindhoven, Netherlands, under the designation PXE5. The transducer 10 can be replaced by a conventional buzzer or, for example, by optical indicators such as flashing indicator lights, LED's, or the like, and visible in the view finder, triggered by a malfunction signal. Mechanical warning signals can also be generated, for example by electromagnetic operation. Thus, a warning flag could be dropped, visible in the view finder of the camera, or a blocking pin or lever operated to mechanically lock the wind-up lever 42.

Contact 25 not only energizes the oscillator 8 and hence the transducer 10, if operated by the relay, but additionally starts a timing interval of timing circuit 9. Timing circuit 9 provides a positive pulse to the base of transistor 34 after a predetermined time, determined by the time constant of the R/C circuit 32/31 connected to a unijunction transistor 27. When unijunction transistor 27 provides a positive pulse to the base of transistor 34, transistor 34 becomes conductive, short-circuiting the relay 25, so that contact 25b will open and the oscillator, and hence the entire circuit, will be disconnected from the battery 28 of the camera. Resistor 33 is a current-limiting resistor to protect the relay contacts and to decrease the drawing current from the battery. Resistor 32 and capacitor 31 together form the timing element which determines the operating interval of the oscillator 8. Resistors 17 are decoupling resistors to determine defined switching conditions when switch 2 is either open or closed, and suppress possible contact chatter pulses.

The film transport monitoring system is thus continuously ready to monitor transport of film without, however, drawing any current unless film is actually moved. In still cameras, the time of film transport is irrelevant, and the distance through which the film is wound is determined by the stroke of the film transport or wind-up lever 42. In motion picture cameras it is either necessary to associate a certain distance of film transport with a film footage counter, or to provide a timing circuit to eliminate the time element with respect to the number of pulses, as the film moves through the film gate at a predetermined speed.

The system can be equally applied to a motion picture camera (FIG. 6) in which an operating switch 61 is coupled to a timer 66 initiating a certain timing interval. The time interval is fixed for any given film speed and to permit proper counting of the number of pulses with different film speeds, the timer 66 is connected to the film speed controller 65 provided on most motion picture cameras so that, upon selection by the user of a higher film speed, a shorter time interval is commanded to sense a predetermined number of pulses from the film as it is being transported. Film movement itself can be sensed either by cams operating switches similar to cam 43 and switch 2, and respectively connected to the film payout reel 68 or the film take-up reel 69. Preferably, the film payout reel 68 is used. The film transport can also be sensed by sensing loading on the film transport sprocket schematically shown at 64, and operating switch 62, which then would correspond to switch 2. If the film sprocket 64 should run free, there will be no pull thereon, or no reaction. If there is a load reaction—which can be sensed, for example, by a slight shift of the sprocket wheel, permitted by a spring, switch 62 will operate to provide the predetermined number of pulses during the time that a predetermined film length passes through the film gate—as determined by timer 66 in view of the speed setting by speed control 65. If the film is not being fed, so that either the sprocket is blocked, or if no film is present so the sprocket runs free and is unloaded, no pulses, or an insufficient number of pulses, will be generated during the timing interval as determined by timer 66. Initiation of the timing interval determined by timer 66 of film camera 60 is preferably controlled by the operator control lever 61, although it may also be controlled by rotation of the film take-up spool 69. Switch 2 is then preferably associated with the film payout spool 68, or with the film directly, or with apparatus connected either to the spool, or to the film, or sensing the perforations of the film. The remainder of the circuit can be substantially as described in connection with the still camera 48 of FIGS. 1 and 4.

Various changes and modifications may be made within the scope of the inventive concept.

We claim:

1. Automatic film transport monitoring system for still and motion picture cameras, comprising
   film movement sensing means (2, 43; 62) coupled to the film (54, 67) and generating at least one film movement pulse as the film advances in the camera, said film movement sensing means providing a predetermined number of output pulses corresponding to and representative of a predetermined length of film being advanced in the camera;
   and a pulse count number evaluation circuit (3, 4, 6) connected to and controlled by said film movement sensing and pulse generating means (2, 43; 62) and providing an alarm output signal if said predetermined number of output pulses has not been attained.

2. System according to claim 1, wherein the pulse count number evaluation circuit (3, 4, 6) comprises a counter (4) providing a first output signal if said predetermined number of pulses are counted, and a second output signal if said predetermined number of pulses is not reached upon counting of the counter.

3. System according to claim 2, wherein the camera has an operating controller (42, 61) operated upon initiation of film movement; a power source (28) is provided;
   and wherein a switch (1) is provided, connected to the power source and to the counter (4) and operated by said controller (42, 61) upon initiation of movement of the film, the switch resetting the counter (4) to an initial state upon first operation thereof to permit the counter to start counting said pulses derived from said film movement sensing and pulse generator means.

4. System according to claim 2, wherein the pulse count number evaluation circuit includes a test logic stage (6) connected to the counter (4) and responsive to decode whether the counter has provided said first output signal or said second output signal, said logic stage controlling generation of said alarm output signal.

5. System according to claim 1, further including an electro-acoustic transducer (10) and an oscillator (8) connected to the electro-acoustic transducer, said oscillator being controlled by said alarm output signal if said predetermined number of output pulses has not been attained.

6. System according to claim 5, further including a timing circuit (9) connected to and controlled by said alarm output signal and further connected to control the operating time of said oscillator to initiate a timing interval when first sensing said alarm output signal, and then disconnecting the oscillator upon elapse of said timing interval.

7. System according to claim 5, wherein said transducer is a piezo electric transducer.

8. System according to claim 1, further including an optical transducer responsive to said alarm output signal and providing an optical indication if said predetermined number of output pulses has not been attained.

9. System according to claim 1, wherein the camera is a still camera having a film take-up spindle or shaft (46);
   and wherein said film movement sensing and pulse generating means comprises a cam (44) in driving connection with said film take-up shaft or spindle (46), and a switch (1) closed upon movement of said film take-up spindle, said switch connecting the film movement and sensing means and said pulse count evaluation circuit to a source of energy (28) if, and only if, said transport shaft or spindle is operated during movement of the film, the switch (1) opening upon termination of film movement to disconnect said film movement and pulse generation means and the pulse count number evaluation circuit from the energy source.

10. System according to claim 1, wherein the film movement sensing and pulse generating means includes a multi-land cam (43) coupled to a film payout shaft or reel (50, 68);
    a switch (2) operated by the lands of the multi-land cam (43), the switch (2) opening and closing repeatedly upon rotation of the film payout shaft or reel (50, 68), the number of openings corresponding to the length of film transported by one frame.

11. System according to claim 1, wherein the film movement sensing and pulse generating means comprises means (51, 52, 53; 64, 62) scanning movement of film perforations upon transport of the film.

12. System according to claim 1, for use in motion picture cameras, including a timing circuit (66) coupled to the film movement sensing and pulse generator means and to said pulse count number evaluation circuit to provide timing intervals during which the number of pulses generated by said film movement and pulse generator means are evaluated.

* * * * *